Dec. 21, 1965 W. F. BOGUSZ 3,224,126
DISPLAY BOARDS AND MAGNETS USEFUL THEREWITH
Filed June 27, 1962
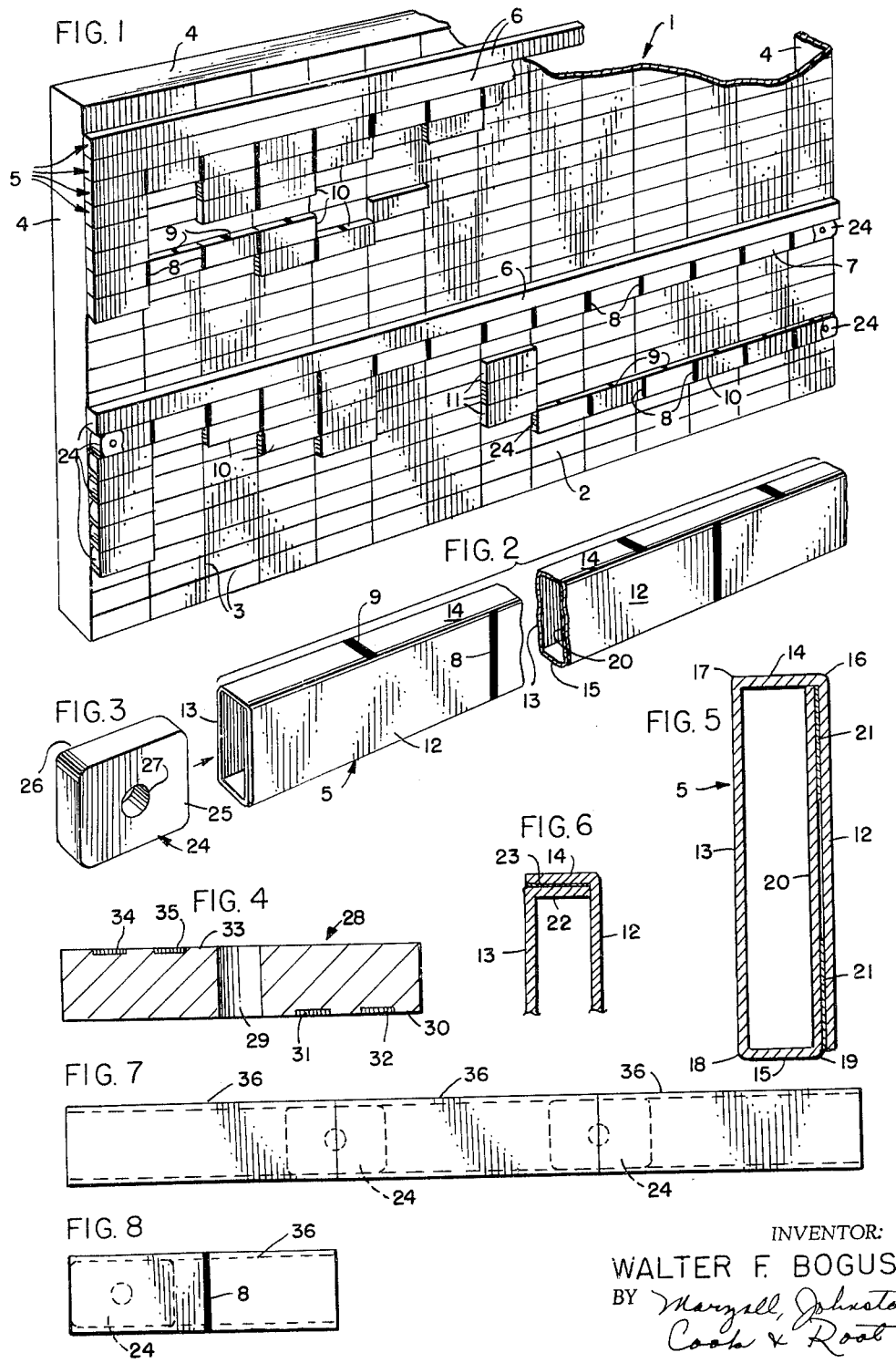
INVENTOR:
WALTER F. BOGUSZ
BY Marzall, Johnston,
Cook & Root
ATT'YS United States Patent Office 3,224,126
Patented Dec. 21, 1965

3,224,126
DISPLAY BOARDS AND MAGNETS
USEFUL THEREWITH
Walter F. Bogusz, 405 N. Knight Ave., Park Ridge, Ill.
Filed June 27, 1962, Ser. No. 205,619
3 Claims. (Cl. 40—63)

This invention, in general, relates to display boards having members on which can be written or printed indicia of diverse character and which are removably held on said board by magnetic force. One of the primary uses for the display boards of the character herein described is that of a production schedule board of the type now in use in many industries. Such production schedule boards have a listing in horizontal lines, which are divided into vertical columns, of jobs or orders from various customers being processed by a plant or other place of business. On these boards are listed such items as the customer's name, the quantity ordered, the promised delivery date, the progress of a job being handled by each department, if there are several departments, the tooling or set-up condition of the job, and any other information which is desirable or necessary for keeping track of the day-to-day condition of a customer's order or job.

These known production schedule boards are either chalk boards or paper sheets containing horizontal lines divided into vertical columns. One of the shortcomings of these production schedule boards lies in the entry of new jobs and the deletion of completed jobs. The completion of jobs entered on the production schedule board very often does not occur in the sequence in which the customer's orders are received and entered on the board. Therefore, when one production schedule board is completely filled it is either necessary to turn to a new board for entry of the next order with the result that there may be carried in the production schedule data kept by a plant office two or more production boards, all containing jobs which are still in stages of completion by the plant or department. The maintenance of two or more production schedule boards can be avoided by entering on the new production schedule board all of the uncompleted jobs appearing on the filled production schedule board, but this has the disadvantage of an added burden to the clerical worker in connection with the maintenance of production schedule boards, plus the possibility that the entries on the new board will not correspond with the uncompleted jobs on the old production schedule board.

One of the primary advantages of this invention is that the members making up the horizontal lines on the schedule board can be arranged in any order and can be shifted upwardly into a position occupied previously by a member on which is recorded the information of a job which has been completed and forwarded to the customer. Therefore, the entries appearing on the production schedule board of the invention are always the original entries, and the board will not contain schedule information on jobs which have been completed and sent to the customer. The use of the display boards of the invention as production schedule boards is only one illustrative use of the many uses to which these boards can be put. They can be used for tabulations of a sundry kind, such as retail shop or store new orders for merchandise, boards for recording reservations of various kinds, boards for recording orders by telephone, advertising display boards, etc.

It is, therefore, an object of this invention to provide display boards having members bearing indicia or adapted to be supplied with indicia, which members can be placed on the display board and held thereon in any desired position.

A further object of the invention is to provide elongated, hollow members held on a display board by magnetic force.

Still another object of the invention is to provide improvements in display boards adapted for use in a wide variety of circumstances.

Still another object of the invention is to provide improvements in permanent magnets for use in connection with display boards and the like.

These and other objects and advantages of the invention may be attained by the practice of the generic principles of the invention herein described and illustrated with regard to preferred embodiments of the invention, which are illustrated in the drawing.

In the drawing:

FIG. 1 is a perspective view of a display board carrying a number of elongated tubular display strips held on the board by magnetic force in accordance with the invention, portions of the board being broken away;

FIG. 2 is a broken, perspective view of a tubular display strip of the sort shown on the display board of FIG. 1;

FIG. 3 is a perspective view of a magnet adapted to be inserted into a tubular display strip to hold it on the display board of FIG. 1;

FIG. 4 is a cross-sectional view taken through the center of a preferred form of a magnet which may be used in conjunction with the invention;

FIG. 5 is a vertical section taken through the tubular display strip of FIG. 2;

FIG. 6 is a fragmentary, vertical section taken through a modified form of the display strip;

FIG. 7 is a front elevation of a series of tubular display strips disposed in horizontal alignment with magnets of FIG. 3 mounted in the ends of abutting tubular members, and securing the same together; and FIG. 8 is a front elevation of a short display strip which can be held on the display board by a single magnet bar inserted therein.

To illustrate the invention, the drawings show a display board 1 of magnetic material, such as steel, or other ferrous substance, the board having a flat front face 2. If desired, the front face 2 may be marked with straight lines 3 to divide the board into a plurality of spaces for use in guiding the mounting of indicia carrying members or display strips 5 on the board. If desired, the display board may be made with rearwardly extending side, top and bottom flanges 4, which may be formed with spaced apart bolt holes, if desired, to permit boards to be joined together.

The display strips 5 comprise elongated hollow tubular members preferably having relatively narrow rectangular sectional configuration providing relatively wide side walls spaced apart by relatively narrow edge walls interconnecting the side walls at their opposite edges. These tubes are preferably made of heavy paper or paperboard of sufficient rigidity so that their walls are self-supporting. Other materials may be used, however, if desired.

Some of the tubular display strips 5 may be long, hollow, tubes 6 having on markings on the face thereof. Other tubes 7 may have markings thereon. The markings on these tubes may include cross lines 8, preferably applied to the front and rear faces of the tubes. The horizontal spacing between the cross lines 8 preferably corresponds with the spacing between the vertical lines 3 on the display board 1, and serves to divide the strip into areas which may be marked with any desired indicia to be displayed on the board. The tubes 7 may also have additional markings 9 placed on the top and/or bottom edges of tubes 7 at intervals between the cross lines 8. If desired, there may be one or more markings 9 spaced apart between the cross lines 8, to indicate subdivisions of the area defined between the cross lines.

The display board 1 may also carry tubular display strips 10 of intermediate length, i.e., the length of at least two adjacent sections defined between the cross lines 8, but less than the length of the display board 1. Display strips 11 equal in length to the distance between adjacent section marks 8 may also be mounted on the board.

The tube of FIGS. 2 and 5 is made of a heavy paper or paperboard of the character heretofore described. It is made up by forming right angle bends in the sheet of heavy paper or paperboard to provide a front wall 12, a rear wall 13, a top wall 14 and a bottom wall 15. These walls have right angle bend junctures 16–18. The paper or paperboard sheet is bent to form a right angle bend 19 at the bottom wall 15 to provide what is herein characterized as a tacking wall 20, which is inside of and parallel with the front wall 12 and is preferably of a depth substantially coextensive with the depth of the front wall 12. The tubular member 5 is held in its rectangular sectional shape by securing together the tacking wall 20 and the front wall 12. This may be done by a variety of means, such as pressure-sensitive adhesive strips 21 having pressure-sensitive adhesive on both sides. Alternatively, the walls 12 and 20 may be joined together by stapling, by liquid or paste adhesives, or any other suitable means.

The hollow tube of FIG. 6 is made by folding a sheet of paper or paperboard of the character above described into the characteristic form shown in FIG. 5. Like numerals have been designated to indicate like components in FIG. 6. However, instead of the tacking wall 20 behind the front face 12 (FIG. 5), the embodiment of FIG. 6 has for its tacking wall the wall 22 bent inwardly from the rear wall 13 beneath the top wall 14. The walls 14 and 22 may be held together by a pressure-sensitive adhesive strip 23 of the character of the strips 21 or the other means heretofore described. The tubes 5 are held on the metal display board 1 by permanent magnet bars 24 inserted therein. The magnet bars 24 have a depth and width substantially equal to the corresponding inside dimensions of the tubes 5 so that they are frictionally held in the tubes when inserted therein. These magnet bars are magnetized to provide front and rear faces 25, 26 of opposite magnetic polarity and may contain a round hole 27 extending between these faces. With relatively short tubes 5, one permanent magnet bar 24 is sufficient to hold the tube in place on the display board. With the long tubes of the type of tubes 6 and 7, the tubes are held in place on the display board 1 by a magnet bar 24 inserted into each end of the hollow, rectilinear tube. Note the tubes 7 of FIG. 1.

When bars are magnetized to provide opposite poles in their opposed faces, as in the magnet bar 24, the magnetic fields which prevail at the edges of the bars may cause either attraction between or repulsion between bars when brought into edge to edge juxtaposition on the display board, depending upon whether the like poles of the juxtaposed bars face the same or opposite directions. The repulsive forces thus set up may be of sufficient magnitude to cause the tubes 5 to separate slightly when brought into juxtaposition, and thereby prevent their being positioned with their top and bottom walls 14, 15 in contact one with the other. This difficulty can be overcome by providing a modified form of permanent magnet 28 of the sort shown on FIG. 4. This bar 28 may be formed with a central hole 29 and magnetized by providing small magnetic segments of opposite polarity in each of its opposite faces 30 and 33. In the face 30 there is provided a magnetic segment 31 of a given polarity. Spaced outwardly therefrom is a magnetic segment 32 of opposite polarity. The face 33 is provided with similar magnetic segments 34, 35 of opposite polarity. The outermost segments 32, 34 in faces 30, 33 may be of like or opposite polarity and, correspondingly, the innermost segments 31, 35 in faces 30, 33 may be of opposite or of the same polarity. With permanent magnet bars of the character of the bar 28, the edge attracting and repelling characteristics of the FIG. 3 arrangement are nullified and obviated.

FIGS. 7 and 8 of the drawing illustrate the positioning of the permanent magnets in short tubular members. In FIG. 7, there is shown how a series of 3 short tubular members 36 can be made into a longer tubular member by insertion of the permanent magnet bar 24 in the ends of adjacent tubular members 36 at the junctures thereof. FIG. 8 shows the positioning of the magnet bar 24 in one end of the short tubular member 36, which magnet bar has sufficient magnetic force to hold the tube 36 in position on the display board 1.

The magnets 24 and 28 may be described as wafer magnets in that they comprise relatively thin plate-like elements having polar areas on the opposite faces thereof, and thickness of the order of one-tenth or less of the perimeter thereof, and in any event not greater than, say, one-fifth of the perimeter. While the invention is not necessarily limited to the peripheral shape of the magnets, they should have at least one transverse dimension that corresponds with the width of the tubular strips 5 so that the magnets may have a snug friction fit within the hollow strips. For the same reason the thickness of the wafer magnets preferably should substantially equal the width of the opposite edge walls 14 and 15 of the tubular strips. The magnets preferably have rectangular configuration with rounded corners, as shown, to facilitate insertion into and removal from the tubular strips. Wafer magnets of circular shape, however, may be employed in which case the magnet is sized to match its diameter substantially with the width of the side walls 12 and 13 of the tubular strips.

Magnets of ceramic material, such as Indox, comprising a sintered material containing ferric oxide are particularly well-suited for use in holding tubular display element upon magnetic boards as taught herein.

The foregoing constitutes but one embodiment of the principles of my invention. Other modifications and variations may be employed without departing from the spirit and scope of the invention and the principles thereof, which invention is set forth in the following claims.

The invention is hereby claimed as follows:

1. A display board comprising a ferrous metal sheet, a plurality of elongated paper tubes having substantially flat front and rear walls mounted on said ferrous metal sheet with the substantially flat rear walls thereof lying against said sheet, the front faces of said paper tubes providing a flat surface on which indicia can be marked, said strips being in substantially parallel orientation with a side edge thereof contacting a side edge of an adjacent paper tube, and each of said tubes being held on said sheet by at least one wafer magnet mounted therein, the wafer magnets in said paper tubes having oppositely disposed facing surfaces of substantial area lying against the inner sides of front and rear walls of said paper tubes, said magnets each having a pair of spaced apart polar areas of opposite polarity formed in one of said surfaces, adjacent one end of the magnet, the magnet also having another pair of spaced apart polar areas of opposite polarity formed in the other of said surfaces adjacent the opposite end of the magnet.

2. A display board comprising a substantially flat panel embodying a ferrous metal sheet, a plurality of elongated paper tubes in substantially horizontal, side-by-side, parallel orientation on a face of said panel, each of said tubes having relatively wide, substantially flat, substantially parallel front and rear walls and narrow, parallel side walls defining a narrow, longitudinal, substantially rectangular passage from one end of each tube to the other end, said ends of said tubes being open, at least one flat-faced, thin wafer magnet of substantially rectangular cross-section substantially corresponding to the width and depth of said passage and frictionally, but removably, held in a respective passage of each of said tubes, said magnets holding the respective paper tubes in the desired position on said panel through magnetic attraction with said ferrous metal sheet with the flat, rear wall of the respective paper tubes lying against said panel, and the outer sides of said front walls having vertical lines marked thereon at predetermined, uniform spacings to divide the respective front walls of said tubes into indicia-marking zones, said tubes thereby providing readily movable, horizontal rows on said display board, and said vertical lines on respective tubes being aligned and thereby arranging the indicia marking zones of said tubes in vertical columns.

3. A display board as claimed in claim 2, wherein one of said magnets is mounted in an end of a paper tube with a portion of the magnet protruding outwardly of said end, and another paper tube having an end embracing and frictionally fitted upon the protruding portion of said magnet whereby the magnet interconnects the members in abutting end to end relation and secures both paper tubes upon the display board.

References Cited by the Examiner
UNITED STATES PATENTS

| | | | |
|---|---|---|---|
| 1,123,215 | 1/1915 | Anthony | 40—63 |
| 1,236,234 | 8/1917 | Troje | 317—159 X |
| 2,177,905 | 10/1939 | McKeehan | 317—159 |
| 2,277,057 | 3/1942 | Bach | 46—241 |
| 2,570,625 | 10/1951 | Zemmerman | 46—236 |

FOREIGN PATENTS

| | | |
|---|---|---|
| 504,291 | 12/1954 | Italy. |
| 891,296 | 12/1943 | France. |

EUGENE R. CAPOZIO, *Primary Examiner.*

E. V. BENHAM, JEROME SCHNALL, *Examiners.*